US012037219B2

(12) United States Patent
Prashanth et al.

(10) Patent No.: US 12,037,219 B2
(45) Date of Patent: Jul. 16, 2024

(54) SHEET METAL BASE PANEL FOR USE IN ELEVATORS

(71) Applicant: WITTUR HOLDING GmbH, Wiedenzhausen (DE)

(72) Inventors: S. Deepak Prashanth, Sriperumbudur (IN); Ramakrishnan Menon, Sriperumbudur (IN)

(73) Assignee: WITTUR HOLDING GmbH, Wiedenzhausen (DE)

( * ) Notice: Subject to any disclaimer, the term of this patent is extended or adjusted under 35 U.S.C. 154(b) by 0 days.

(21) Appl. No.: 18/257,561

(22) PCT Filed: Apr. 28, 2022

(86) PCT No.: PCT/IB2022/053949
§ 371 (c)(1),
(2) Date: Jun. 14, 2023

(87) PCT Pub. No.: WO2023/037171
PCT Pub. Date: Mar. 16, 2023

(65) Prior Publication Data

US 2023/0399200 A1 Dec. 14, 2023

(30) Foreign Application Priority Data

Sep. 7, 2021 (IN) ............................ 202141040551

(51) Int. Cl.
*B66B 13/30* (2006.01)
*B66B 11/02* (2006.01)

(52) U.S. Cl.
CPC ........ *B66B 13/303* (2013.01); *B66B 11/0226* (2013.01)

(58) Field of Classification Search
CPC ....... B66B 13/303; B66B 13/30; B66B 11/02; B66B 11/0226
See application file for complete search history.

(56) References Cited

FOREIGN PATENT DOCUMENTS

| | | |
|---|---|---|
| CN | 205061300 U | 3/2016 |
| CN | 205873639 U | 1/2017 |
| CN | 107840229 A | 3/2018 |

(Continued)

OTHER PUBLICATIONS

Machine Translation of EP 1403204.*

(Continued)

*Primary Examiner* — Diem M Tran
(74) *Attorney, Agent, or Firm* — Alston & Bird LLP

(57) ABSTRACT

A sheet metal base panel for use in elevators is disclosed wherein the said base panel is made from sheet metal of low thickness without compromising its structural integrity, by a specialised hemming process. The said base panel is constructed from a single sheet of metal and incorporates the top and bottom header to form a unitary component. The construction is such that the headers can be positioned either way and hence possesses rotational symmetry which enables in easier installation. This is achieved by a special bending of the base panel on all edges of both the top side and bottom side, four times—a first 90° bending (1*a*) followed by a second 90° bending (1*b*), a third 90° bending (1*c*) and a fourth 180° hemming (1*d*) of the open edge formed after the third 90° bending (1*c*).

8 Claims, 5 Drawing Sheets

(56) References Cited

FOREIGN PATENT DOCUMENTS

| | | | | | |
|---|---|---|---|---|---|
| CN | 109455608 | A | | 3/2019 | |
| CN | 209337932 | U | * | 9/2019 | .............. B23P 15/00 |
| CN | 113148817 | A | * | 7/2021 | |
| EP | 2008958 | A1 | | 12/2008 | |
| ES | 2241939 | T3 | | 11/2005 | |
| WO | WO-9940017 | A1 | * | 8/1999 | ............. B66B 13/26 |
| WO | WO-2018011921 | A1 | * | 1/2018 | ............. B66B 13/30 |
| WO | WO-2018020065 | A1 | * | 2/2018 | ........... B66B 13/303 |

OTHER PUBLICATIONS

International Search Report and Written Opinion for PCT/IB2022/053949 (ISA/EP) mailed Aug. 5, 2022 (10 pages).
International Preliminary Report on Patentability for PCT/IB2022/053949 (IPEA/EP) dated Mar. 16, 2023 (24 pages).

* cited by examiner

SHEET METAL BASE PANEL FOR USE IN ELEVATORS

CROSS REFERENCE TO RELATED APPLICATIONS

This application is a national stage application, filed under 35 U.S.C. § 371, of International Application No. PCT/IB2022/053949, filed Apr. 28, 2022, which claims priority to India Application No. 202141040551, filed Sep. 7, 2021, the contents of both of which as are hereby incorporated by reference in their entirety.

TECHNICAL FIELD

The present invention generally belongs to the field of elevators, specifically to the field of construction of elevator doors and cars and more specifically relates to the field of sheet metal base panels used in elevator doors and cars. The present invention relates to a sheet metal base panel for use in elevators, the said novel feature making the panels cost effective by reducing the thickness requirement of the sheet metal without compromising on the structural integrity of the panels.

BACKGROUND

In the elevator industry, base panels made of sheet metals are commonly used in landing doors, car doors and the car itself.

Conventionally, elevator doors (landing doors and car doors) are made up of the following components—a bottom header, a top header, a base panel and stiffener. The base panels are always made of sheet metal of uniform thickness throughout the panel. The thickness of the sheet metal is decided based on the strength needed at the weakest point of the panel when subjected to mechanical tests as specified by the standards. Thus the default thickness of the sheet at the weakest point becomes the thickness of the entire panel. Usually, such elevator door or car panels have base panel thickness of 0.8 mm and above. The elevator cars, also called cabins, are constructed with a steel framework for durability and strength, and are made up of a ceiling, platform and base panels. The sides of the elevator cars are also usually made from steel sheet and are trimmed on the inside with paneling. In elevator cars, the base panels connect the ceiling and the platform.

Therefore, there is extensive use of base panels in the elevator industry. However, with rise in sheet metal prices, there is a need to provide base panels which would reduce the costs involved in manufacture of elevators without compromising on the structural integrity of the base panels.

DESCRIPTION OF RELATED ART

Chinese Patent Application CN201811591042A discloses an integrated elevator door panel structure wherein the left and right ends of the panel body are respectively provided with left and right flanges. The upper and lower ends of the panel are respectively provided with upper and lower flanges. The inner side wall of the hemming is provided with curling, the inner side of the curling is provided with a connecting piece, and the bottom of the connecting piece is provided with a guide shoe under the lower hemming; there is an installation cavity, and the installation cavity is provided with reinforcing ribs fixed on the surface of the board. The said patent document claims that such panel structure has the characteristics of being able to effectively increase the production efficiency and improve the overall strength of the door panel.

Chinese Patent Application CN201620607387U discloses a one-piece bending type elevator door which includes a door panel main body, an upper head, a lower head, and a door slider mounted on the said lower head. In the main body of the said elevator door, the sides (left and right sides) are bent in an inverted U-shape to form a package structure. The U-shaped inverted portion of the door panel body is bent to form the upper head and the lower side is formed in a stepped inversion to form the lower head, and the stepped portion includes at least one vertical surface, the said door slider being mounted on the said vertical surface. The stepped shape described in this example is a secondary step shape comprising a first stage step connected directly to the door panel body and a second stage step connected to the first stage step end, the door slider being mounted on the vertical plane of the first step. The patent document discloses that the said door is made of one-piece moulding, thereby reducing the door production process and making the process simple and easy to achieve and also reduces the cost of the elevator car door.

Chinese Patent Application CN201520720563U discloses an elevator door with a new integrated structure, including a main door with a door body which includes a side folding on the left and right sides, an upper and a lower hemming, wherein the lower hem is provided with mounting holes for mounting a door slide, the said lower hem also folded edge wise through a first and second bending edge, and a bending on the third side and fourth side, thereby forming four stepped off side, wherein the lower end of the vertical flanges of the rim includes a lower hem with a vertical mounting plate, wherein the vertical mounting plate is bent through the first side and the second side of the bend is bent twice in L-shaped manner, the vertical position corresponding to the lower hem of the mounting plate. The mounting hole is located in the vertical mounting plate, wherein the first folded edge and second folded edge between the first and three folding edges, grooves are formed for installation of slider between the edges of the fourth bend. The said novel feature, especially of the lower hem through elevator door plant lower part which adopts the quartic bending, is proposed to not only reduce the manufacturing procedure of the door plant, but has also guaranteed the rigidity of the door plant and claimed to make the installation of the door slider convenient.

Document EP 2008958 A1 discloses a doorway of an elevator that is opened/closed by a door for the elevator. The door for the elevator has a panel member and a back member provided on a back side of the panel member. The panel member and the back member are continuous with each other at each end of a door panel in a width direction thereof. The panel member and the back member are continuous with each other in a region that is formed by bending a board. The back member has a back-side superposition portion superposed on a back surface of the panel member. Thus, the door panel can be manufactured with ease simply by bending the board. A strength of the door panel can be ensured as well through reinforcement resulting from the bending of the board and reinforcement due to the back member. In addition, even in a case where, for example, one hand of a passenger is inserted into a back side of the door panel, the passenger can be prevented from having this hand cut by the door panel.

Document CN 107840229 A discloses a sheet metal base panel according to the preamble of claim 1.

However, the above said inventions do not completely address the problems in the prior art, particularly, they do not provide an effective mechanism to reduce the thickness requirement of the sheet metal base panels used in elevator landing & car doors and the cars itself, without compromising on the structural integrity of the said panels. The patents disclosed in the prior art documents are also not installation friendly as the holes to fix the base panel are not symmetrical. Therefore, there is a need in the art to provide a sheet metal base panel for use in elevators which is cost friendly as well as installation & assembly friendly.

The information disclosed in this background of disclosure section is only for enhancement of understanding of the general background of the invention and should not be taken as acknowledgement or any form of suggestion that this information forms the prior art already known to a person skilled in the art.

Further it will be apparent to those skilled in the art that the objects of this invention have been achieved by providing a sheet metal base panel for use in elevators, which is unique in nature unlike existing systems or the ones described in the above prior art in the field known to the inventors. Various changes may be made in and without departing from the concept of the invention. Additional features of the invention will be described hereinafter that form the subject of the claims of the invention. Those skilled in the art should appreciate that they can readily use the disclosed conception and specific embodiment as a basis for designing and modifying other methods and structures for carrying out the same purpose of the present invention. Further, features of some stages disclosed in this application may be employed with features of other stages. Therefore, the scope of the invention is to be determined by the terminology of the following claims and the legal equivalents thereof.

BRIEF SUMMARY

One or more problems of the conventional prior art may be overcome by various embodiments of the present invention.

It is the primary object of the present invention to provide a sheet metal base panel for use in elevators which makes the manufacturing of elevators cost effective when compared to existing sheet metal base panels.

Another object of the present invention is to provide a sheet metal base panel for use in elevators wherein the thickness of the said panels is the lowest possible while at the same time the structural integrity of the said panels are not compromised.

Yet another object of the present invention is to provide a sheet metal base panel for use in elevators wherein the said panels are easy to install and assemble.

Still another object of the present invention is to provide a sheet metal base panel for use in elevators wherein the improved structure does not affect the aesthetics of the elevators doors and cars.

Another object of the present invention is to provide a process of manufacturing a sheet metal base panel for use in elevators.

These and other objects and advantages of the present subject matter will be apparent to a person skilled in the art after consideration of the following detailed description taken into consideration with accompanying drawings in which the preferred embodiment of the present subject matter are illustrated.

The following disclosure presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

The present invention embodies a sheet metal base panel for use in elevators, the said sheet metal base panel comprising of:

(i) a single main body (1) having top side, bottom side, left side, and right side, wherein edges of both the top side and bottom side of the said main body (1) is given a first 90° bending (1*a*) followed by a second 90° bending (1*b*) and a subsequent third 90° bending (1*c*) which forms an open edge that is subsequently hemmed by 180° (1*d*) respectively;

(ii) at least a pair of holes (1*e*, 1*f*) symmetric to each other, on the top side and bottom side respectively of the main body (1);

(iii) at least a pair of stiffeners (2) attached to rear side of the said main body (1); and, (iv) a bracket (3) and shoe (4) arrangement fixed to the main body (1) at the said pair of holes (1*f*) at one end of the said main body (1), the said end forming the bottom header.

The present invention further provides a process of manufacturing the sheet metal base panels for use in elevators, the said process comprising the steps of:

(i) making a first 90° bending (1*a*) using a standard bending machine, at edges of both the top side and bottom side of the main body (1) of the said sheet metal base panel;

(ii) making a second 90° bending (1*b*) following the said first 90° bending (1*a*);

(iii) making a third 90° bending (1*c*) following the said second 90° bending (1*b*); and, (iv) making a 180° hemming (1*d*) at the open edge formed after the said third 90° bending (1*c*), using the said standard bending machine; and (v) attaching at least a pair of stiffeners (2) to rear side of the said main body (1) after 180° hemming at the open edge.

The various advantages of the present invention include:

1. The base panel becomes at least 50% lighter. Thereby, base input material cost is reduced.
2. Due to the light weight of the door panel, its assembly becomes easier.
3. Door panel is symmetrical in assembly (left, right, top & bottom) directions.
4. All 4-folding edges are welded in the rear side of the base panel without affecting front side aesthetics.
5. Hem sections increase the structural strength of the elevator door.
6. Usually 2 personnel are required to install the door. With the light weight of the door panel such installation can be performed by 1 personnel.
7. The door constructed using the base panel of improved structure is 180° symmetric. Therefore, installation is easier as the headers can be positioned either way.

BRIEF DESCRIPTION OF THE FIGURES

The advantages and features of the present invention will be more readily apparent by persons skilled in the art when considered in reference to the following description and when taken in conjunction with the accompanying drawings listed below.

DETAILED DESCRIPTION OF VARIOUS EMBODIMENTS

The following description is presented to enable any person skilled in the art to make and use the invention and is provided in the context of particular applications of the invention and their requirements. The present invention can be configured as follows:

Construction

According to a preferred embodiment of the present invention, as shown in FIGS. 1 to 5B, the present invention provides a sheet metal base panel for use in elevators, the said sheet metal base panel comprising of:

- (i) a single main body (1) having top side, bottom side, left side, and right side, wherein edges of both the top side and bottom side of the said main body (1) are given a first 90° bending (1*a*) followed by a second 90° bending (1*b*) and a subsequent third 90° bending (1*c*) which forms an open edge that is subsequently hemmed by 180° (1*d*) respectively;
- (ii) at least a pair of holes (1*e*, 1*f*) symmetric to each other, on the top side and bottom side respectively of the main body (1);
- (iii) at least a pair of stiffeners (2) attached to rear side of the said main body (1); and,
- (iv) a bracket (3) and shoe (4) arrangement fixed to the main body (1) at the said pair of holes (1*f*) at one end of the said main body (1), the said end forming the bottom header.

In the preferred embodiment of the present invention, the stiffeners (2) are arranged in the shape of a cross on the rear side of the said main body (1), thereby strengthening the mid-section of the base panel.

In another preferred embodiment of the present invention, the thickness of the stiffeners (2) is more than the thickness of the base panel, contrary to the arrangement in existing elevators.

In an embodiment of the present invention, the sheet metal base panel disclosed herein is used in the landing door of an elevator.

In another embodiment of the present invention, the sheet metal base panel disclosed herein is used in the car door of an elevator.

In an embodiment of the present invention wherein the sheet metal base panel disclosed herein is used in the car door or landing door of an elevator, the said door is of the centre opening type.

In another embodiment of the present invention wherein the sheet metal base panel disclosed herein is used in the car door or landing door of an elevator, the said door is of the telescopic opening type.

In yet another embodiment of the present invention, the sheet metal base panel disclosed herein is used in the cabin/car panel of an elevator.

Figure 1:
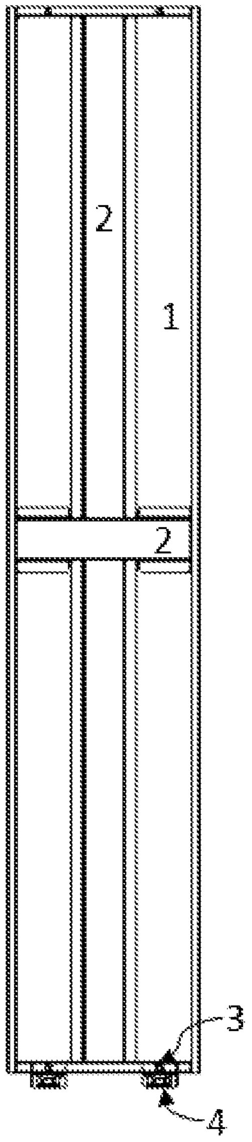
FIG. 1 is the rear view of an embodiment of the sheet metal base panel for use in elevators disclosed by the present invention.
Figure 2:
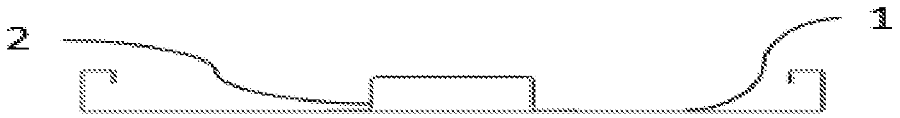
FIG. 2 is the sectional view of the sheet metal base panel for use in elevators disclosed by the present invention.
Figure 3:
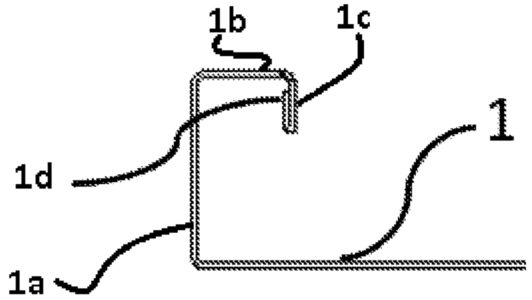
FIG. 3 is the enlarged sectional view (section X-X & Y-Y) of the bendings given to edges of the top side and bottom side of the single main body (1) of sheet metal base panel for use in elevators disclosed by the present invention.
Figure 4A:
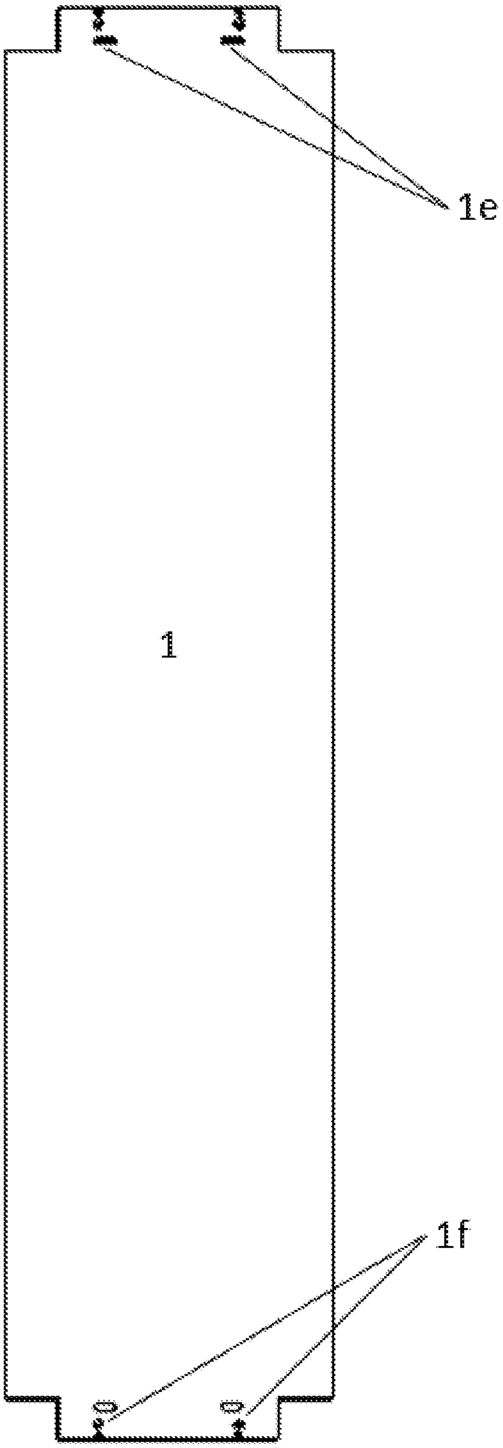
FIG. 4A represents the sheet metal base panel before it is administered the structure disclosed by the present invention.
Figure 4B:
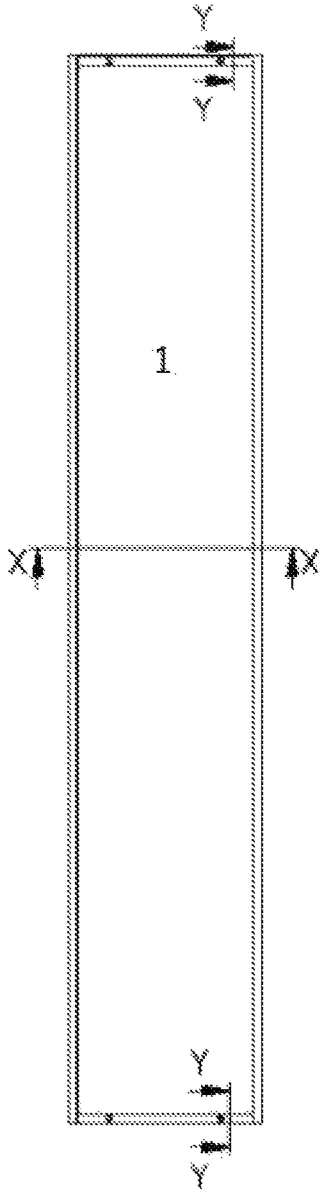
FIG. 4B represents the sheet metal base panel after the bendings on all sides as disclosed by the present invention.
Figure 5A:
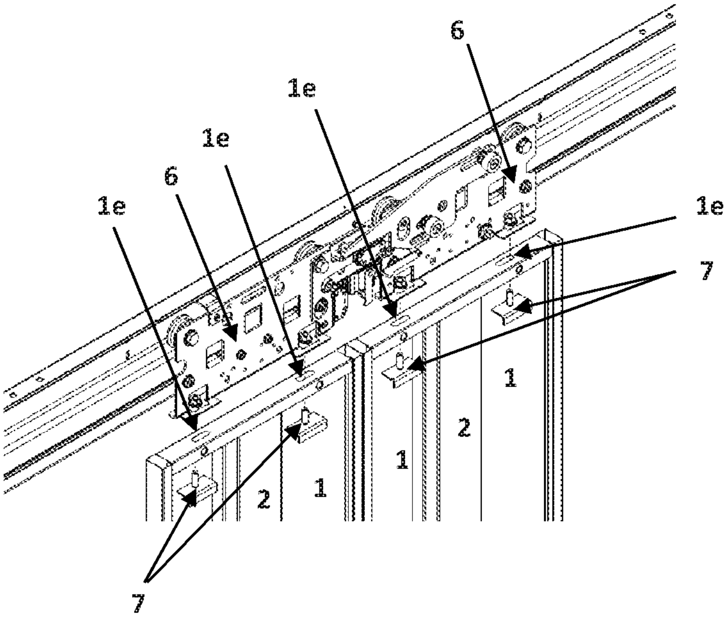
FIG. 5A represents the elevator door panel top interface with the lift mechanism, of an embodiment of the sheet metal base panel disclosed by the present invention, wherein the said base panel is used in the elevator door.
Figure 5B:
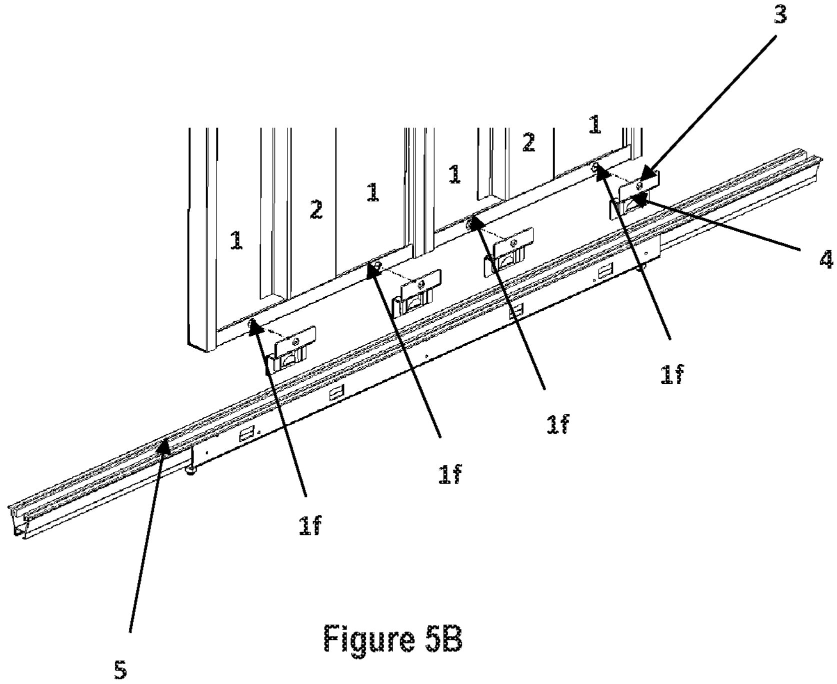
FIG. 5B represents the elevator door panel bottom interface with the sill, of an embodiment of the sheet metal base panel disclosed by the present invention, wherein the said base panel is used in the elevator door.

In an embodiment of the present invention wherein the sheet metal base panel disclosed herein is used in the landing door of an elevator, as shown in FIG. 5A, the said base panel is installed by fastening the top of the main body (1) to the truck plate (6) through two L-brackets (7) i.e. a fastener riveted along with bracket passing through the pair of holes (1*e*) present on the said base panel. The said truck plate is in turn fastened to the top mechanism of the lift with rollers to move to the sides when the door opens. In the same embodiment, as shown in FIG. 5B, the said base panel is installed by fastening the top of the main body (1) to the bracket (3) passing through the pair of holes (1*f*) and shoe (4) arrangements are inserted into the sill slot (5) for sliding.

The above mentioned specific embodiments are provided herein for illustrative purposes only. A person skilled in the art would be able to reproduce and/or apply the said construction in various other ways not expressly mentioned herein, for example, by employing the sheet metal base panel disclosed herein as cabin/car panels. Such constructions will be within the spirit and scope of the present patent specification.

Working

It is a well established practice known to any person reasonably skilled in the art that the base panels are always made of sheet metal of uniform thickness throughout the panel. The thickness of the sheet metal is decided based on the strength needed at the weakest point of the panel when subjected to mechanical tests as specified by the standards. Thus the default thickness of the sheet at the weakest point becomes the thickness of the entire panel. Usually, elevator door/car panels have base panel thickness of 0.8 mm and above.

The novel and inventive structure disclosed by the present invention strengthens the weakest parts of the panels through a process called hemming. This allows the weakest parts of the panel to have a higher thickness while the rest of the panel would be having half the thickness. Therefore, this novel and inventive aspect disclosed by the present invention allows the use of very thin metal sheets whose thickness range from 0.5 mm to 0.7 mm to manufacture sheet metal based component for elevators. This unique aspect thus brings a significant reduction in costs while complying with the structural strengths specified for the sheet metal components used in elevators.

The two longitudinal sides of the base panel disclosed by the present invention act as the top and bottom header and therefore there is no requirement for separately attaching a top and bottom header like in conventional base panels.

The novel feature disclosed by the present invention allows for use of sheet metal of thickness as low as ≥0.5 mm to ≤0.7 mm in base panel. The improvement in the existing structure is due to the use of the 180° hemming process across all the open edges of the sides of the base panel. Since the edges are the ones that bear the maximum load in the door, such hemming arrangement ensures a double wall thickness of cross sectional in the edges although the thickness of the sheet metal is only ≥0.5 mm to ≤0.7 mm. Such hemming is found on all four sides of the base panel. The selective strengthening of the weak points i.e., the edges of the base panel, is the reason that a sheet metal of ≥0.5 mm to ≤0.7 mm thickness can be used as input for construction. Since the centre of the door panel only has ≥0.5 mm to ≤0.7 mm thickness, stiffeners of 0.8 mm thickness are used to add structural support to the centre to resist deflection during mechanical tests.

Using the hemming process, it is possible to assimilate the bottom and upper header components into the construction of the base panel to create a unit component comprising of three components. The structure of the elevator base panel preserves the functionality of the base panel, incorporates the functionality of the upper and bottom header in the same base panel while increasing the strength by 10%. Conventionally 3 different sheets of metal thickness were employed to create the door panel—upper and bottom header, base panel, stiffeners. The thickness of sheet metals used for the headers and the base panels used differ varyingly. The present invention utilizes only one sheet of metal of only one thickness to create a unit component that serves as the base panel, upper header and bottom header.

The present invention achieves the objects set out in the specification hereinabove by creatively engineering the structure of the elevator sheet metal base panels used in landing door, car door and the car itself. The uniqueness of the base panel structure disclosed by the present invention lies in the following features:

(i) Reduction in the number of components: A conventional elevator door comprises of a base panel (thickness≥0.8 mm) attached to a top and a bottom header wherein the top and bottom headers are originally separate components. However, the structure of the present invention employs a single base panel, eliminating the two extra components while retaining their functionality. Same logic is applicable to car panels too especially those which cater to loads≤680 kg.

(ii) Reduction in the thickness of the sheet metal (base panel for elevator doors and cars) in the range of ≥0.5 mm to ≤0.7 mm while maintaining the same structural integrity in order to pass the mechanical tests as specified in the standards by Bureau of Indian Standards (BIS) or any other standards local or international.

Evaluation of Invention and Test Results

A mechanical test was performed on the sheet metal base panels disclosed herein according to IS 14665 (Part 4_Sec 6). The following were the dimensions of the tested samples:

Thickness of panels: 0.5 mm
Stiffener thickness: 0.8 mm
Top Frame: 70×40 mm
Side Frame: 90×40 mm
Clear Opening×Clear Height: Centre opening 2 panel-(700×2000 & 800×2000)

Two samples of the following description were tested:

Sample 1—Centre opening 2 panel—700×2000 full Steel sheet metal (0.5 mm)

Sample 2—Centre opening 2 panel—800×2000 full Steel sheet metal (0.5 mm)

According to IS 14665 (Part 4_Sec 6), 345N forces perpendicular to 5 cm2 area were applied with a dial gauge with plunger (deformation measurement tool).

The test criteria are that there should be no plastic deformation and the test should not result in the doors being sprung from their guides.

The following test results were obtained:

| | Location | | | | | | |
|---|---|---|---|---|---|---|---|
| | P1 | | P2 | | P3 | | |
| Prototypes | Elastic | Plastic | Elastic | Plastic | Elastic | Plastic | Result |
| Sample 1 | 13.10 | 0.09 | 14.61 | 0.12 | 14.78 | 0.10 | Passed |
| Sample 2 | 12.52 | 0.03 | 13.89 | 0.06 | 14.13 | 0.04 | Passed |

Therefore, the novel and inventive structure disclosed by the present invention to improve sheet metal base panels have been shown to pass the mechanical requirements of IS 14665 (Part 4_Sec 6).

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Further embodiments may also be obtained by combining two or more dependent claims.

It will be apparent to those skilled in the art that the objects of this invention have been achieved by providing the above invention. However various changes may be made in the structure of the invention without departing from the concept of the invention. Therefore, the scope of the invention is to be determined by the terminology of the following claims and the legal equivalents thereof

We claim:

1. A sheet metal base panel for use in elevators, the said sheet metal base panel comprising a single metal sheet having a uniform thickness forming a top header, a bottom header, and a single main body (1) having top side, bottom side, left side, and right side, wherein edges of the single metal sheet at the top side and the bottom side of the said main body (1) form the top header and the bottom header, respectively, by giving a first 90° bending (1*a*) followed by a second 90° bending (1*b*) and a subsequent third 90° bending (1*c*) which forms an open edge, wherein the sheet metal base panel contains at least a pair of stiffeners (2) attached to rear side of the said main body (1), characterized in that said open edge of the top header and of the bottom header is hemmed in by 180° (1*d*), and in that the stiffeners (2) are arranged in the shape of a cross on the rear side of the main body (1), thereby strengthening the mid-section of the base panel.

2. The sheet metal base panel for use in elevators as claimed in claim 1, wherein the sheet metal base panel contains at least a pair of holes (le, 1*f*) symmetric to each other, on the top header and bottom header respectively.

3. The sheet metal base panel for use in elevators as claimed in claim 2, wherein the sheet metal base panel contains a bracket (3) and shoe (4) arrangement fixed to the bottom header at said pair of holes (1*f*) at the bottom header.

4. The sheet metal base panel for use in elevators as claimed in claim 1, wherein the thickness of the stiffeners (2) is more than the thickness of the base panel.

5. The sheet metal base panel for use in elevators as claimed in claim 1, wherein the material of the said base panel is stainless steel.

6. The sheet metal base panel for use in elevators as claimed in claim 1, wherein the material of the said base panel is mild steel.

7. The sheet metal base panel for use in elevators as claimed in claim 1, wherein the said base panel is used in landing doors, car doors and cabin panels of elevators, said landing door being a centre opening type, or a telescopic opening type.

8. An elevator comprising a sheet metal base panel according to claim 1.

* * * * *